G. G. MARTIN.
AUTOMOBILE TIRE.
APPLICATION FILED NOV. 22, 1919.
1,342,339. Patented June 1, 1920.
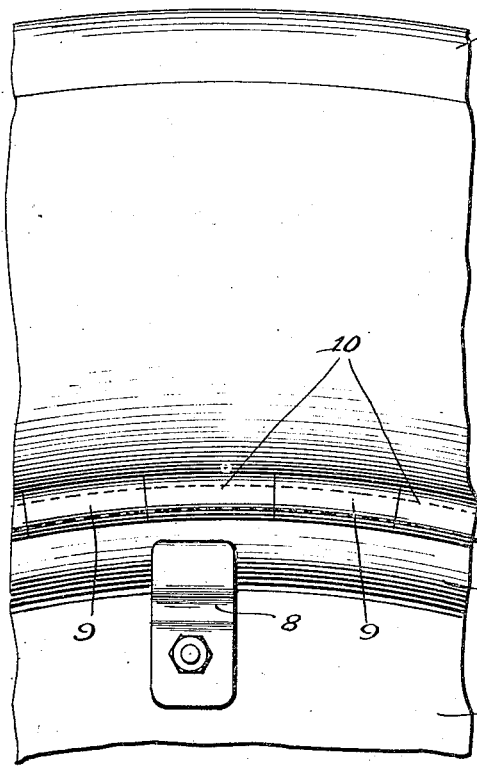
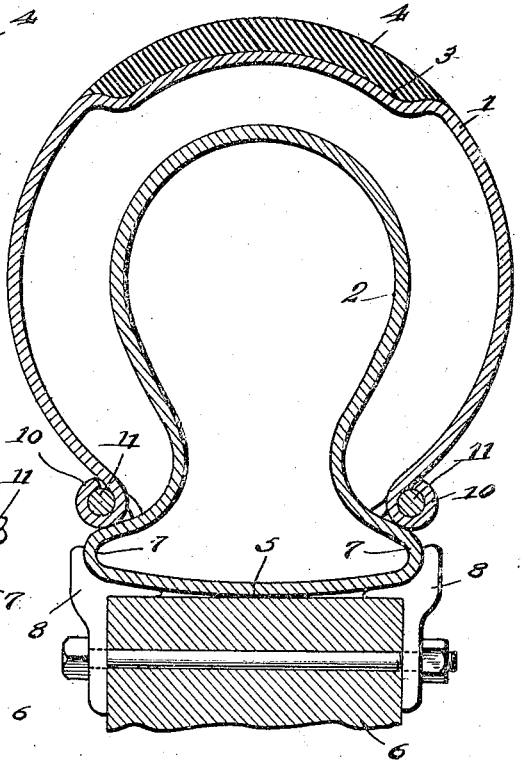
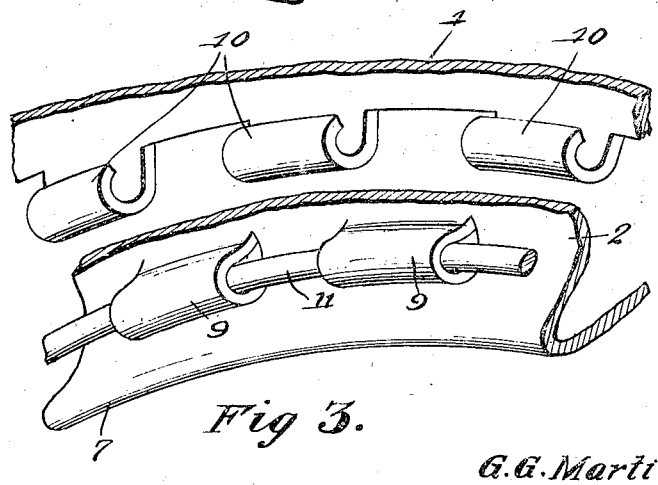
Inventor
G. G. Martin.
Witnesses
R. A. Thomas.
By Victor J. Evans
Attorney

UNITED STATES PATENT OFFICE.

GEORGE GUY MARTIN, OF EAST ST. LOUIS, ILLINOIS.

AUTOMOBILE-TIRE.

1,342,339.　　　　　　Specification of Letters Patent.　　　Patented June 1, 1920.

Application filed November 22, 1919. Serial No. 339,787.

*To all whom it may concern:*

Be it known that I, GEORGE G. MARTIN, a citizen of the United States, residing at East St. Louis, in the county of Saint Clair and State of Illinois, have invented new and useful Improvements in Automobile-Tires, of which the following is a specification.

This invention relates to improvements in automobile tires and the principal object of the invention is to provide a tire made entirely of metal with the exception of its tread portion and so constructed as to have the cushion effects of a pneumatic tire.

Another object of the invention is to provide an inner and outer member which are spaced apart to provide an air space with means for detachably connecting the members together.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a cross section through a tire constructed in accordance with my invention and showing the same attached to a wheel.

Fig. 2 is a side view of part of my improved tire.

Fig. 3 is a fragmentary view showing the means for attaching the two parts of the tire together.

As shown in these views the tire consists of an outer member 1 and an inner member 2. These members are preferably made of spring steel and the outer member has the shape of an ordinary tire. It is provided with an indented portion in its tread which forms a recess 3 and this recess is filled with rubber and canvas as shown at 4, or any suitable material for engaging the road surface and acting to deaden the sound of the contact of the tire with the road. The outer part of the member 2 is of substantially the same shape as the member 1 but is much smaller so as to leave a space between the two members. The inner part of said member 2 has its sides curving outwardly to the point where they will join the substantially flat bottom 5. This bottom 5 is adapted to engage the felly 6 of the wheel 1 and the beads 7 formed by the junction of the curved sides with said bottom are engaged by the usual clips 8 of the wheel. The outer member 1 is connected with the curved inner sides of the inner member 2 in the following manner: Slits are cut in the said curved sides and the metal between the alternate slits is pressed outwardly to form the loops 9. Spaced tongues 10 are formed on the edges of the outer member 1 and these tongues are rolled over to form loops. These loops are adapted to enter the spaces between the loops 9 when the two parts are assembled and then rods 11 are threaded through the loops to hold the two parts together.

It will thus be seen that the outer member 1 formed of spring steel bears against the inner member which relieves said outer member of shocks and jars. The fact that the parts are formed of steel all danger of punctures and blowouts is obviated and a cushion effect secured.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A tire of the class described comprising an inner member of metal formed with continuous walls and having lateral projections adjacent its inner circumference, an outer member of spring metal spaced from the inner member and means for connecting the edges of the outer member to the lateral projections.

2. A tire of the class described comprising an inner and outer member of spring metal, the inner member being provided with a slightly curved bottom and outwardly extending walls adjacent said bottom forming beads and means for connecting the edges of the outer member to the said beads.

3. A tire of the class described comprising an inner member formed of metal and provided with a slightly curved bottom and outwardly extending walls adjacent said bottom forming beads, an outer member formed of spring metal, means for hinging the edges of said outer member to the beads and a tread of sound deadening material carried by said outer member.

In testimony whereof I affix my signature.

GEORGE GUY MARTIN.